US008464696B2

(12) United States Patent
Liimatta (10) Patent No.: US 8,464,696 B2
(45) Date of Patent: Jun. 18, 2013

(54) SUPERCHARGED ENGINE SYSTEM (75) Inventor: Gary David Liimatta, Milan, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 456 days.

(21) Appl. No.: 12/781,248

(22) Filed: May 17, 2010

(65) Prior Publication Data
US 2011/0277709 A1 Nov. 17, 2011

(51) Int. Cl.
*F02B 33/00* (2006.01)

(52) U.S. Cl.
USPC .................................. 123/559.1; 123/65 BA (58) Field of Classification Search
USPC .......... 123/559.1–565, 572–573, 54.4, 65 BA
See application file for complete search history.

(56) References Cited

U.S. PATENT DOCUMENTS

| | | | | | |
|---|---|---|---|---|---|
| 1,625,597 | A | * | 4/1927 | Fornaca | 123/559.1 |
| 1,644,719 | A | * | 10/1927 | Fliedner | 123/559.1 |
| 1,706,391 | A | * | 3/1929 | Benjamin | 123/559.1 |
| 1,967,069 | A | * | 7/1934 | Shoemaker | 123/65 BA |
| 2,113,077 | A | | 4/1938 | Buchi | |
| 2,412,457 | A | * | 12/1946 | Harrison | 123/90.16 |
| 2,551,307 | A | * | 5/1951 | Yingling | 123/563 |
| 2,858,666 | A | * | 11/1958 | Fullemann | 123/65 BA |
| RE24,645 | E | * | 5/1959 | Chayne | 123/54.7 |
| 2,963,006 | A | * | 12/1960 | Karde | 123/559.1 |
| 3,418,986 | A | * | 12/1968 | Scherenberg | 123/559.1 |
| 3,540,421 | A | * | 11/1970 | Boyce, Jr. et al. | 123/65 BA |
| 3,949,719 | A | * | 4/1976 | Bellanca et al. | 123/572 |
| 4,480,968 | A | * | 11/1984 | Duerr | 123/65 BA |
| 4,528,969 | A | * | 7/1985 | Senga | 123/572 |
| 5,031,592 | A | * | 7/1991 | Jones et al. | 123/308 |
| 5,101,794 | A | * | 4/1992 | Van Blaricom | 123/65 BA |
| 5,115,791 | A | * | 5/1992 | Dore | 123/572 |
| 5,269,144 | A | * | 12/1993 | Miller et al. | 123/564 |
| 5,433,180 | A | * | 7/1995 | Hitomi et al. | 123/559.1 |
| 5,440,881 | A | | 8/1995 | Sudmanns et al. | |
| 5,647,337 | A | * | 7/1997 | Johnson et al. | 123/572 |
| 5,911,211 | A | * | 6/1999 | Uchida | 123/559.1 |
| 6,029,637 | A | * | 2/2000 | Prior | 123/559.1 |
| 6,227,179 | B1 | | 5/2001 | Eiermann et al. | |
| 6,453,890 | B1 | * | 9/2002 | Kageyama et al. | 123/559.1 |
| 6,837,195 | B2 | * | 1/2005 | Suwazono | 123/559.1 |
| 7,011,079 | B2 | * | 3/2006 | Park | 123/559.1 |
| 7,080,547 | B2 | * | 7/2006 | Beyer et al. | 73/114.37 |
| 7,310,947 | B2 | | 12/2007 | Baumann | |
| 7,415,960 | B2 | | 8/2008 | Snyder et al. | |
| 7,426,921 | B2 | * | 9/2008 | Billings et al. | 123/559.1 |
| 7,694,667 | B2 | * | 4/2010 | Williams et al. | 123/559.1 |
| 7,950,363 | B2 | * | 5/2011 | Currie et al. | 123/184.57 |
| 8,118,013 | B2 | * | 2/2012 | Arvan | 123/572 |
| 8,156,905 | B2 | * | 4/2012 | Stemmer | 123/54.4 |

(Continued)

FOREIGN PATENT DOCUMENTS

| | | | |
|---|---|---|---|
| JP | 2010138747 A | * | 6/2010 |
| RU | 2158373 C1 | * | 5/2000 |
| WO | WO 0068552 A1 | * | 11/2000 |
| WO | WO 2012087907 A2 | * | 6/2012 |

*Primary Examiner* — Thai Ba Trieu
(74) *Attorney, Agent, or Firm* — Julia Voutyras; Alleman Hall McCoy Russell & Tuttle LLP (57) ABSTRACT

A system for supplying compressed air to an engine is presented. In one embodiment, the system includes a cylinder block that forms at least part of an air compressor housing. The system may improve engine balance and reduce engine assembly cost.

17 Claims, 5 Drawing Sheets

U.S. PATENT DOCUMENTS

| | | | |
|---|---|---|---|
| 8,201,544 B2 * | 6/2012 | Cattani et al. | 123/572 |
| 8,209,983 B2 * | 7/2012 | Palazzolo et al. | 60/624 |
| 2002/0046743 A1 * | 4/2002 | Moren | 123/572 |
| 2003/0037757 A1 * | 2/2003 | Osband | 123/195 R |
| 2005/0235942 A1 | 10/2005 | McCullagh | |
| 2009/0078240 A1 | 3/2009 | Diggs et al. | |
| 2010/0147270 A1 * | 6/2010 | Pursifull et al. | 123/521 |
| 2011/0023800 A1 * | 2/2011 | Ives et al. | 123/54.4 |

* cited by examiner

SUPERCHARGED ENGINE SYSTEM

FIELD

The present description relates to a system for supplying pressurized air to an internal combustion engine. The system may be useful for improving engine balance and reducing engine assembly costs.

BACKGROUND AND SUMMARY

Engines may be supercharged to improve engine performance and to extend the dynamic operating range of the engine. Superchargers pressurize air entering the engine by way of a compressor, thereby increasing the amount of air available to the engine. The compressor of a supercharger may be configured with meshing lobes or a centrifugal pump. In U.S. Pat. No. 6,227,179 a supercharger is coupled to engine cylinder heads by way of intake passages that are fed air from an intercooler located downstream of the supercharger. The described supercharger is purported to offer ease of assembly, small packaging, and nimble response. However, bolting a supercharger to the top of an engine may result in alignment issues between the compressor pulley and the engine drive pulley. As such, the compressor may degrade engine balance. Further, coupling the compressor above and away from the engine may limit engine speed since the effective engine inertia is increased by moving the rotating mass away from the crankshaft. Further still, it appears that hoses are required to supply coolant to the intercooler thereby increasing the possibility for developing a coolant leak.

The inventor herein has recognized the above-mentioned disadvantages and has developed a system for improving a supercharged engine.

One embodiment of the present description includes a system, comprising: an engine block having a plurality of cylinders for housing a plurality of pistons, the engine block contiguous with at least a portion of a supercharger air compressor housing, the supercharger air compressor housing having an inlet for fresh air and an outlet that provides compressed air to cylinders in the cylinder block; and a cylinder head receiving air from said supercharger air compressor housing.

By forming at least a portion of a supercharger air compressor housing from an engine block, it may be possible to improve engine balance, reduce engine inertia, and lower the possibility of coolant leaks. For example, a supercharger constructed in the valley of a V engine may reduce engine inertia, lower engine assembly cost, improve engine balance, and reduce the number of engine hose connections. In one example, the rotors or scrolls of a supercharger may be placed in the valley of a V engine between engine cylinders. Moving the compressor scrolls closer to the engine crankshaft can reduce engine inertia and improve engine balance since the compressor scroll mass is located closer to the rotational mass of the crankshaft. In addition, when an intercooler coupled to the compressor housing is supplied coolant from the engine block or cylinder heads, the number of hose connections of the engine may be reduced, thereby reducing the possibility of coolant leaks.

The present description may provide several advantages. For example, the approach may reduce engine inertia and improve engine balance. Further, the approach may reduce the possibility of coolant leaks. Further still, the approach may reduce engine costs since the supercharger can be machined at the same time that the engine block is being machined.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
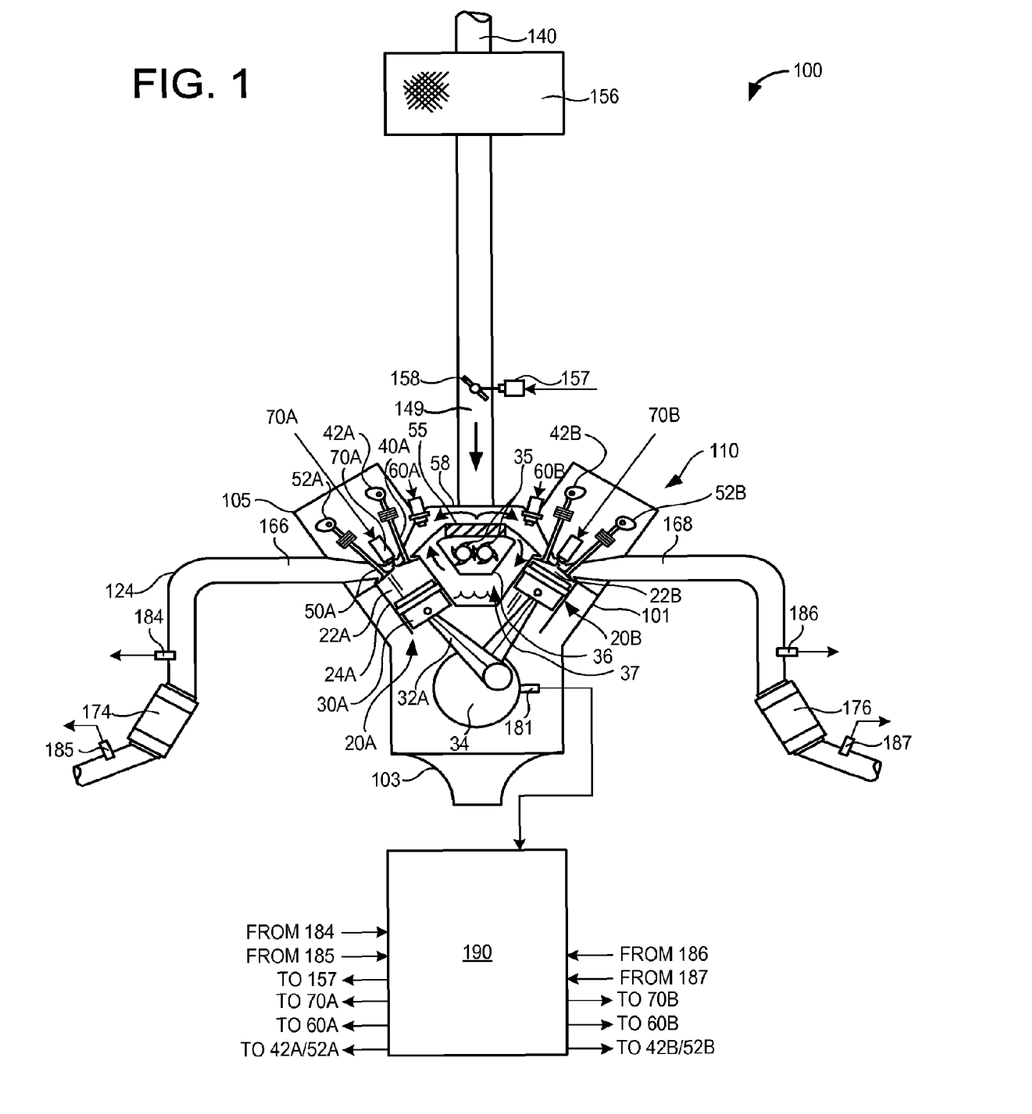
FIG. 1 is a schematic diagram of an engine.
Figure 2:
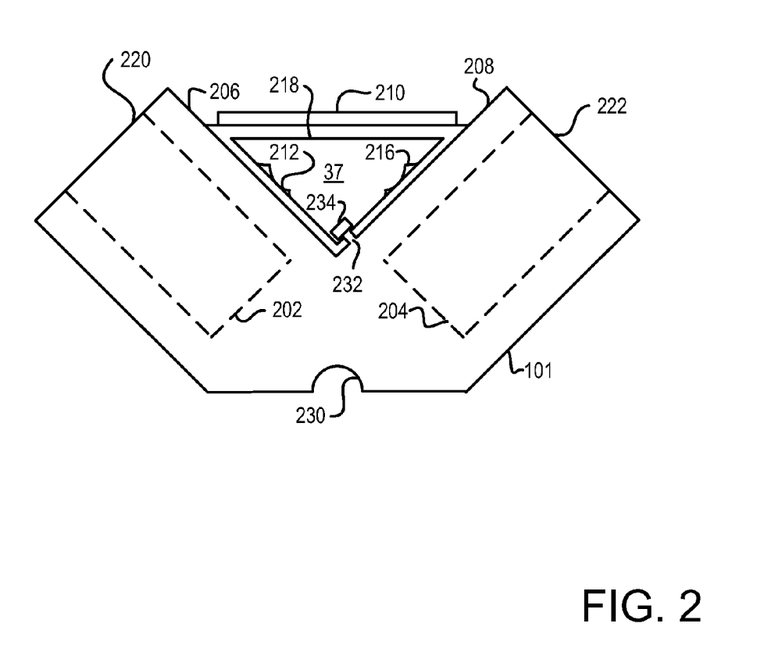
FIG. 2 shows front view of an eight cylinder engine block.
Figure 3:
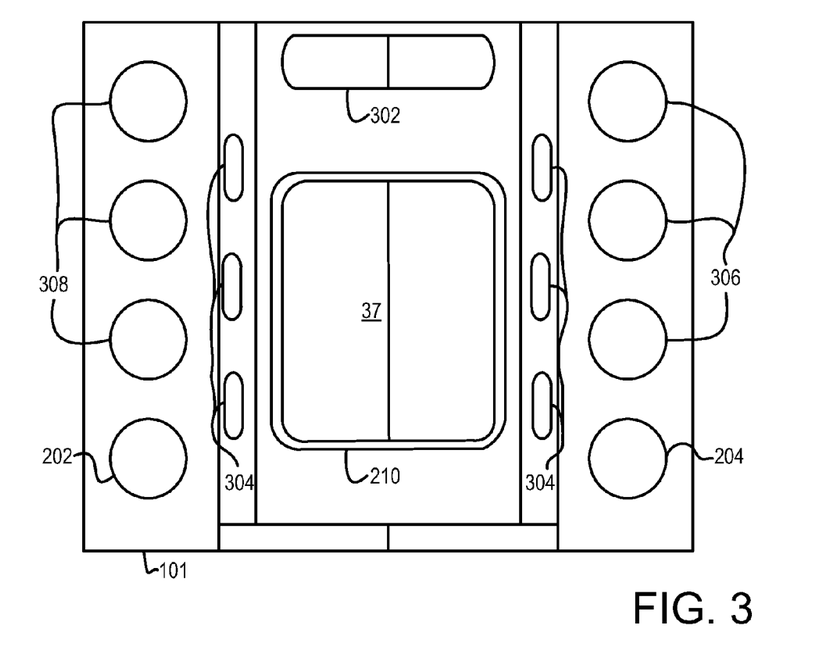
FIG. 3 shows a plan view of an eight cylinder engine block.

The present description is related to an engine block with a compressor housing. In one non-limiting example, the engine block may be configured as illustrated in FIGS. 1-3. Further, the compressor may supply compressed air to an intercooler and intake manifold as shown in FIGS. 4-7. Finally, a method for supplying compressed air to an engine block with a compressor housing is described by FIG. 8.

FIG. 1 shows a schematic depiction of an example engine system 100 including a multi-cylinder internal combustion engine 110 having an integrated compressor housing 36. As one non-limiting example, engine system 100 can be included as part of a propulsion system for a passenger vehicle. Engine system 100 can receive intake air via intake passage 140. Intake passage 140 can include an air filter 156.

Air travels through intake passage 140 and encounters throttle 158 before entering intake passage 149. In some examples, intake passage 149 may part of engine block 101. Air entering intake passage 149 is directed into the bottom of compressor housing 36. At least a portion of compressor housing 36 is an integral portion of engine block 101. Compressor lobes or scrolls 35 compress air before directing air to intercooler 55. Compressor lobes separate an upper section of compressor 37 from a lower section of compressor 37. The lower section of compressor 37 contains uncompressed air for supplying engine cylinders. The upper section of compressor 37 may contain air compressed by scrolls 35. Air from compressor 37 is directed to intercooler 55 and then to intake manifold 58 before entering engine cylinders 20A and 20B. Intake manifold 58 may include an intake manifold pressure sensor (not shown) and/or an intake manifold temperature sensor (not shown), each in communication with control system 190. Intake passage 149 can include also include a pressure sensor. The position of throttle 158 can be adjusted by control system 190 via throttle actuator 157 communicatively coupled to control system 190. A bypass valve may be included between intake passage 149 and intake manifold 160 to bypass compressor 37. Thus, throttle 158 is positioned upstream of compressor 37. Further, compressor 37 is located upstream of intercooler 55, and intercooler 55 is located upstream of intake manifold 58.

Engine 110 may include a plurality of cylinders two of which are shown in FIG. 1 as 20A and 20B in cylinder block 101. Note that in some examples, engine 110 can include more than two cylinders such as 4, 5, 6, 8, 10 or more cylinders. These various cylinders can be equally divided and arranged in a V configuration in-line with one of cylinders 20A and 20B. Cylinders 20A and 20B among other cylinders of the engine may be identical in some examples and include identical components. As such, only cylinder 20A will be described in detail. Cylinder 20A includes a combustion chamber 22A defined by combustion chamber walls 24A. A piston 30A is disposed within combustion chamber 22A and is coupled to a crankshaft 34 via a crank arm 32A. Crankshaft 34 may include an engine speed sensor 181 that can identify the rotational speed of crankshaft 34. Engine speed sensor 181 can communicate with control system 190 to enable a determination of engine speed. Cylinder 20A can include a spark plug 70A for delivering an ignition spark to combustion chamber 22A. However, in some examples, spark plug 70A may be omitted, for example, where engine 110 is configured to provide combustion via compression ignition. Combustion chamber 22A may include a fuel injector 60A, which in this example is configured as a port based fuel injector. However, in other examples, fuel injector 60A can be configured as a direct in-cylinder injector.

Cylinder 20A can further include at least one intake valve 40A actuated via an intake valve actuator 42A and at least one exhaust valve 50A actuated via an exhaust valve actuator 52A as part of cylinder head 105. Cylinder 20A can include two or more intake valves and/or two or more exhaust valves along with associated valve actuators. In this particular example, actuators 42A and 52A are configured as cam actuators, however, in other examples, electromagnetic valve actuators (EVA) may be utilized. Intake valve actuator 42A can be operated to open and close intake valve 40A to admit intake air into combustion chamber 22A via intake manifold 58. Similarly, exhaust valve actuator 52A can be operated to open and close exhaust valve 50A to exhaust products of combustion from combustion chamber 22A into exhaust passage 166. In this way, intake air may be supplied to combustion chamber 22A via intake manifold 58 and products of combustion may be exhausted from combustion chamber 22A via exhaust passage 166.

It should be appreciated that cylinder 20B or other cylinders of engine 110 can include the same or similar components of cylinder 20A as described above. For example, fuel injector 60B, intake valve actuator 42B, and exhaust valve actuator 52B. Thus, intake air may be supplied to combustion chamber 22B via intake manifold 58 and products of combustion may be exhausted from combustion cylinder 20B via exhaust passage 168. Note that in some examples a first bank of cylinders including cylinder 20A as well as other cylinders can exhaust products of combustion via a common exhaust passage 166 and a second bank of cylinders including cylinder 20B as well as other cylinders can exhaust products of combustion via a common exhaust passage 168. Further, oil pan 103 is coupled to engine block 101 for holding oil supplied to lubricate cylinders 20A and 20B.

Products of combustion that are exhausted by engine 110 via exhaust passage 166 can be directed to atmosphere via exhaust passage 166. Exhaust passage 166 may include an exhaust aftertreatment device such as catalyst 174, and one or more exhaust gas sensors indicated at 184 and 185, for example. Similarly, products of combustion exhaust by one or more cylinders via exhaust passage 168 can be directed to ambient. Exhaust passage 168 may include an exhaust aftertreatment device such as catalyst 176, and one or more exhaust gas sensors indicated at 186 and 187, for example. Exhaust gas sensors 184, 185, 186, and/or 187 can communicate with control system 190.

Engine system 100 can include various other sensors. For example, at least one of intake passages 140 can include a mass air flow sensor (not shown). A mass airflow sensor may include, as one example, a hot wire anemometer or other suitable device for measuring mass flowrate of the intake air.

Control system 190 can include one or more controllers configured to communicate with the various sensors and actuators described herein. As one example, control system 190 can include at least one electronic controller comprising one or more of the following: an input/output interface for sending and receive electronic signals with the various sensors and actuators, a central processing unit, memory such as random accessible memory (RAM), read-only memory (ROM), keep alive memory (KAM), each of which can communicate via a data bus. Control system 190 may include a proportional-integral-derivative (PID) controller in some examples. However, it should be appreciated that other suitable controllers may be used as can be appreciated by one skilled in the art in light of the present disclosure.

Control system 190 can be configured to vary one or more operating parameters of the engine on an individual cylinder basis. For example, the control system can adjust valve timing by utilizing a variable cam timing (VCT) actuator, spark timing by varying the time at which the spark signal is provided to the spark plug, and/or fuel injection timing and amount by varying the pulse width of the fuel injection signal that is provided to the fuel injector by the control system. Thus, at least the spark timing, valve timing, and fuel injection timing can be actuated by the control system.

Referring now to FIG. 2, a front view of a non-limiting eight cylinder V-8 engine block is shown. Cylinder block 101 includes cylinders 202 and 204. Cylinder 202 is one of a plurality of cylinders in a first bank of cylinders. Likewise, cylinder 204 is one of a plurality of cylinders in a second bank of cylinders. Cylinder block 101 is a continuous piece of material and may be comprised cast iron, aluminum, ceramic, or other suitable material.

A first side of engine block wall 206 is comprised of material that is continuous with material comprising engine cylinder 202 and crankshaft journal bearing support 230. A second side of engine block wall 206 includes a portion of the wall that is at least a portion of an inside wall of air compressor 37. Thus, engine block wall 206 is at least a portion of a housing of air compressor 37. Engine block wall 206 extends from the bottom of the intersection of engine cylinder banks (e.g., the bottom of the V between engine cylinders) to cylinder deck 220. Thus, compressor 37 shares a portion of engine block wall 206 with engine block material that supports a wall of cylinder 202. A cylinder head (not shown) is coupled to cylinder deck 220.

Similarly, a first side of engine block wall 208 is comprised of material that is continuous with material comprising engine cylinder 204. A second side of engine block wall 208 is at least a portion of an inside wall of compressor 37. Thus, engine block wall 208 is at least a portion of a housing of air compressor 37. In addition, engine block wall 206 and engine block wall 208 are part of a continuous piece of material forming engine block 101. Thus, engine block wall 208 is at least a portion of a housing of air compressor 37. Engine block wall 208 also extends from the bottom of the intersection of engine cylinder banks (e.g., the bottom of the V between engine cylinders) to cylinder deck 222. A cylinder head (not shown) is coupled to cylinder deck 220.

Engine block wall 208 may also include a machined surface 212 on the inside of compressor 37 for sealing a lower section of the compressor housing from an upper section of compressor housing. Compressor lobes, scrolls, or rotors (not shown) and machined surface 212 seal a lower chamber of a housing of compressor 37 from an upper housing of compressor 37 that may contain pressurized air.

In this example, the housing of compressor 37 includes a span 218 that links an area of engine block 101 between engine block wall 206 and engine block wall 208. Span 218 is made of material that is continuous with material of engine block wall 206 and engine block wall 208. Span 218 encloses an area between engine block wall 206 and engine block wall 208 enclosing an area formed by part of a housing of compressor 37. Span 218 also includes an outlet opening 210 for transferring compressed air from compressor 37 to an intercooler (not shown).

When compressor is completely assembled one or more rotors or scrolls (not shown) may be included as part of compressor 37. Further, a front plate and a rear plate may be coupled to engine block 101 to seal a housing of compressor 37. In an alternative embodiment, a front and rear section may be a continuous part of engine block 101. The rotors or scrolls may be mounted to the front and rear plates such that the rotors can rotate within compressor 37 and move air from a lower section of compressor 37 (e.g., an area below the compressor scrolls) to an upper section of compressor 37 (e.g., an area above the compressor scrolls). The rotors may be driven by a chain from the crankshaft or by a gear set coupling the rotors to the crankshaft. Further, machining of surfaces 212 and 216 as well as rotor mounting journal supports may be referenced from engine block datum points.

Engine block 101 also includes port 232 for evacuating gases from the engine crankcase. Flow from the engine crankcase is regulated by crankcase ventilation valve 234. Thus, the engine crankcase can be ventilated directly to the compressor without the gases exiting the boundary of the engine. Ventilation valve 234 may be controlled mechanically or by a controller.

Referring now to FIG. 3, a plan view of the top of an engine block is shown. In particular, the top of engine block 101 shown if FIG. 2 is shown. Engine block 101 includes a cylinder 202 and cylinders 308 on the left side of engine block 101. Engine block 101 also includes cylinder 202 and cylinders 306. Engine block 101 also includes coolant ports 304 for cooing air passing though an intercooler (not shown) that is coupled to engine block 101. In one embodiment, engine coolant may flow from one side of the engine block to the other side of the engine block through intercooler 55. In another embodiment, engine coolant flow from the V area of the engine block to the intercooler. Compressor 37 also includes inlet 302 and outlet 210. Air enters compressor 37 through inlet 302 and compressed air exits outlet 210 before entering an intercooler (not shown). Engine block 101 and material surrounding compressor inlet 302, compressor outlet 210, cylinder 202, cylinders 308, cylinder 204, cylinders 306, and coolant ports 304 is a single continuous piece of material. When fully assembled, compressor 37 includes scrolls or lobes for compressing air entering the compressor housing. In one non-limiting example, the material forming the engine block may be shaped by a casting.

Figure 4:
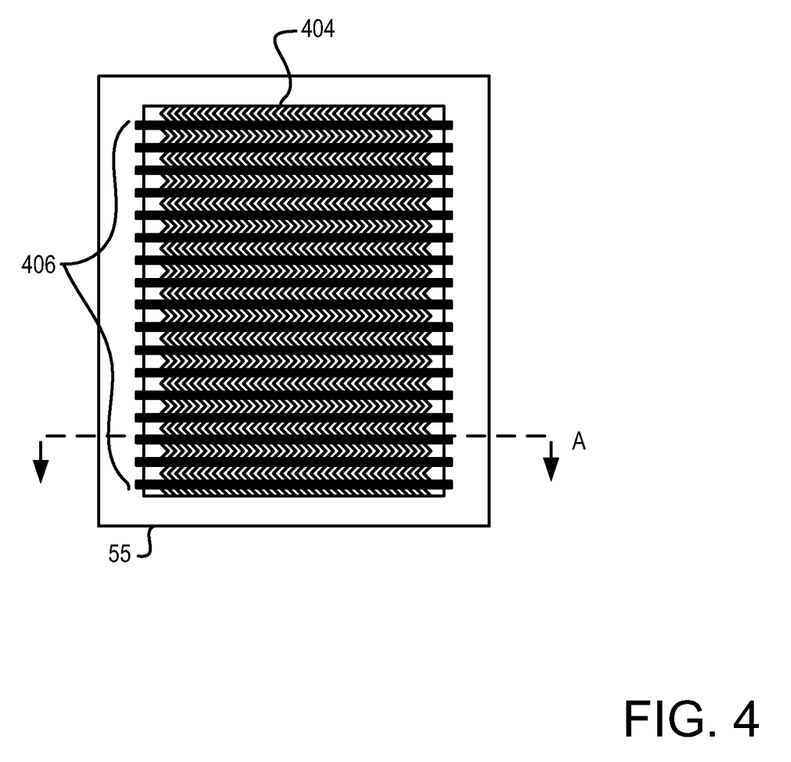
FIG. 4 shows a plan view of an intercooler for a compressor that is integrated into an engine block.
Figure 5:
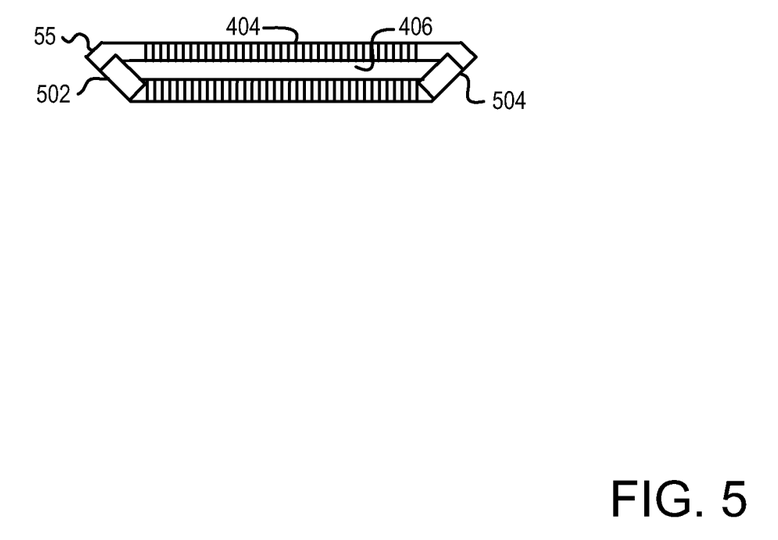
FIG. 5 shows a cross section of an intercooler for a compressor that is integrated into an engine block.

Referring now to FIG. 4, a plan view of an intercooler for cooling air supplied by a compressor that is part of a cylinder block is shown. In particular, a detailed view of intercooler 55 of FIG. 1 is shown. Coolant tubes 406 hold coolant that flows from a first cylinder bank to a second cylinder bank. Coolant reduces the temperature of air compressed by compressor 37 of FIGS. 1-3. Metallic fins 404 link and support coolant tubes 406. Further, fins 404 increase the surface area contact between compressed air and intercooler 55, thereby improving heat transfer between compressed air and engine coolant. Intercooler 55 is coupled to engine block 101 at outlet 210 of compressor 37. FIG. 4 also shows the location of section A which is illustrated in FIG. 5. In some embodiments intercooler 55 may be omitted if desired.

Referring now to FIG. 5, a cross section of an intercooler is shown. In particular, cross section A of intercooler 55 shown in FIG. 4 is illustrated. Intercooler 55 includes fins 404 and coolant tubes 406. The inlets and outlets of a plurality of coolant tubes 406 are combined at inlet manifold 502 and outlet manifold 504. Inlet manifold 502 and outlet manifold 504 are in communication with coolant passages 304 of FIG. 3.

Figure 6:
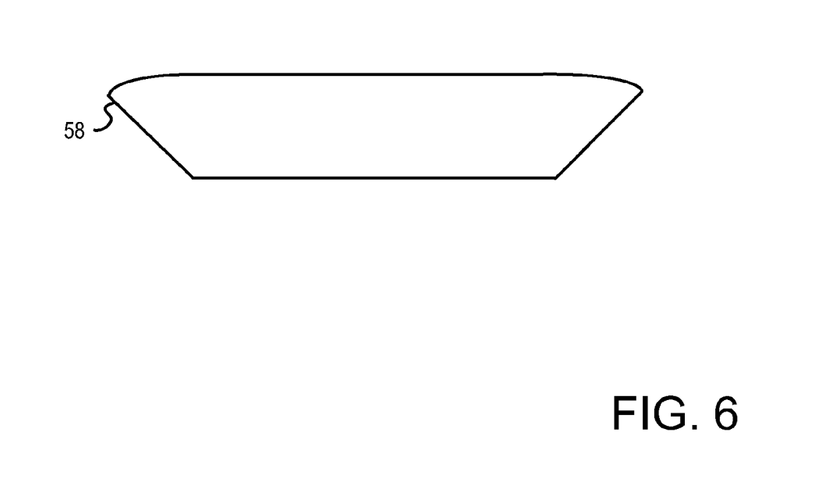
FIG. 6 shows a front view of an intake manifold for supplying air to engine cylinders.

Referring now to FIG. 6, a front view of an intake manifold is shown. In particular, an input manifold that directs air from a compressor integrated into an engine block to engine cylinders as illustrated in FIG. 1 is shown. Air enters from the bottom 600 of intake manifold 58 and exits manifold sides at 602. Intake manifold 58 is coupled to engine block 101 and intercooler 55 of FIG. 1. Intake manifold 58 directs compressed air from an intercooler (e.g. intercooler 55 of FIGS. 1, 4-5) to engine cylinders for increasing the engine air amount.

It should also be mentioned that the engine block of FIGS. 1-3 may be part of a naturally aspirated engine where compressor scrolls and other compressor components are omitted from the compressor housing. Thus, a single block having an integrated compressor housing may be used for both supercharged and naturally aspirated engines.

Figure 7:
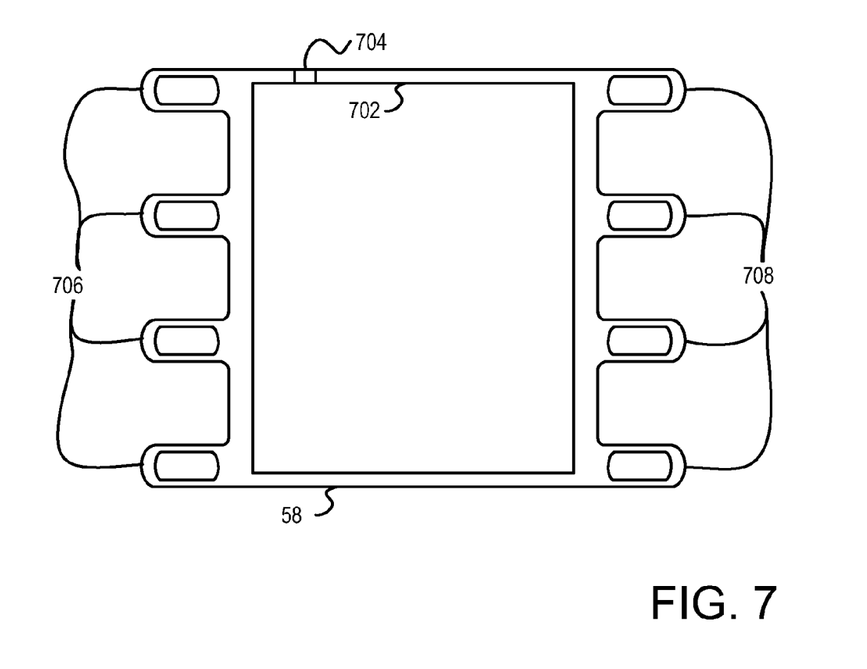
FIG. 7 shows a plan view of the bottom of an intake manifold for supplying air to engine cylinders.

Referring now to FIG. 7, a plan view of a bottom of an intake manifold is shown. In particular, a bottom of the intake manifold shown in FIGS. 1 and 6 is shown. Intake manifold 58 includes inlet 702 and outlets 706 and 708. Air enters intake manifold 58 at air inlet 702 from an intercooler (e.g., the intercooler of FIGS. 1, 4-5) and exits intake manifold 702 at outlets 706 and 708. Intake manifold 58 also included bypass port 704 for bypassing air from an intake system to engine cylinders. For example, bypass port 704 can direct air from inlet passage 149 of FIG. 1 to engine cylinders. Thus, port 704 can direct air from an inlet passage such that the air bypasses compressor 37 and intercooler 55 of FIG. 1.

Thus, the present description provides for a system, comprising: an engine block having a plurality of cylinders for housing a plurality of pistons, the engine block contiguous with at least a portion of a supercharger air compressor housing, the supercharger air compressor housing having an inlet for fresh air and an outlet that provides compressed air to cylinders in the engine block; and a cylinder head receiving air from the supercharger air compressor housing. The system where the engine cylinder block includes at least one boss for coupling a compressor scroll or rotor to the engine cylinder block and where the cylinder head is at least one cylinder head coupled to the engine block. The system further comprising an intercooler coupled to the engine cylinder block, the intercooler located above the compressor scroll or rotor. The system where the engine cylinder block is a V type engine block. The system where the at least a portion of the compressor housing is located in between cylinder in the valley of the V engine. The system where the supercharger air compressor housing includes a front cover coupled to the engine block, the front cover positioned in a vertical orientation with respect to a position of the engine block in a vehicle.

The present description also provides for a system, comprising: an engine cylinder block having a plurality of cylinders for housing a plurality of pistons, the engine cylinder block contiguous with at least a portion of a supercharger air compressor housing, the air compressor housing including at least one at least partially machined surface for accommodating a compressor rotor or scroll; and at least one cylinder head coupled to the engine cylinder block. The system where the at least one at least partially machined surface is inside the compressor housing and where the at least one compressor rotor or scroll is driven by a crankshaft, the crankshaft coupled to the engine cylinder block. The system further comprising a port for inducting gases from a crankcase to the air compressor housing, the crankcase at least partially formed by the engine block, and an oil separator positioned along the port. The system further comprising a front cover coupled to the engine block, the front cover positioned in a vertical orientation with respect to a mounting position of the engine block in a vehicle. The system further comprising an intercooler coupled to the engine cylinder block, the intercooler located above the compressor scroll or rotor, the intercooler in communication with at least a coolant passage of the engine cylinder block or with a cylinder head coupled to the cylinder block. The system where the at least one at least partially machined surface is machined in referenced to a datum of the engine cylinder block. The system further including a manifold directing compressed air from the intercooler to the cylinder head.

The present description further provides for a system, comprising: an engine cylinder block having a plurality of cylinders for housing a plurality of pistons, the engine cylinder block contiguous with at least a portion of a supercharger air compressor housing; an intake manifold in communication with the supercharger air compressor housing; and an intercooler positioned in an air path downstream of the supercharger air compressor housing and upstream of the intake manifold. The system of where the intercooler is coupled to the engine cylinder block and the intake manifold. The system where the engine cylinder block is a V type cylinder block. The system where the intercooler is positioned in the valley of the V type cylinder block. The system where at least one compressor rotor or scroll is located within the supercharger compressor housing and where the at least one compressor rotor or scroll is driven by a crankshaft or a camshaft, the crankshaft coupled to the engine cylinder block the camshaft coupled to a cylinder head. The system where the intercooler is in communication with at least a coolant passage of the engine cylinder block. The system where the intake manifold includes a port for bypassing the supercharger air compressor housing and the intercooler.

It should be appreciated that the engine configurations illustrated by FIGS. 1-7 is exemplary in nature and that other configurations are anticipated by this description. For example, an air compressor may be integrated into the V section of an engine block where a portion of the compressor housing is coupled to the V section of the engine block such that a portion of the compressor housing is formed by the engine block and another portion of the compressor housing is formed by a separate piece of material.

Figure 8:
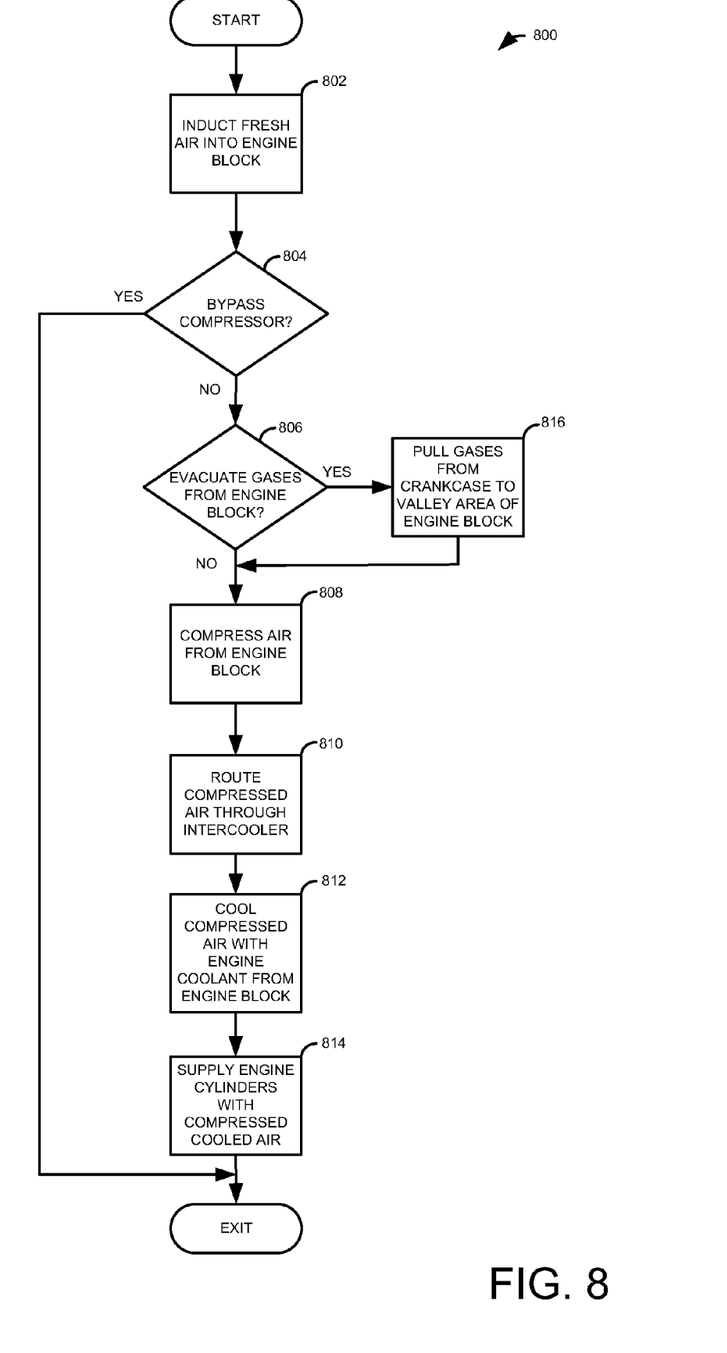
FIG. 8 is a flow chart for supplying air to cylinders of an engine having a compressor housing that is at least partially integrated into an engine block.

Referring now to FIG. 8, a flow chart for supplying air to cylinders of an engine having a compressor housing that is at least partially integrated into an engine block is shown. At 802, routine inducts air to an area of an engine block for pressurization. In one example, fresh air is inducted into the valley of an engine of V type configuration where the compressor housing is a continuous part of the engine block.

At 804, routine 800 judges whether or not to direct fresh air around the compressor integrated into the cylinder block. Air may bypass the compressor by directing air from an air duct located upstream of the compressor to the intake manifold. Routine 800 judges whether or not to bypass the compressor in response to operating conditions of the engine. In one example, air can bypass the compressor when the position of a throttle is less than a predetermined amount or when engine load is less than a predetermined amount. Routine 800 proceeds to 806 when it is judged desirable to pressurize fresh air entering the engine. Otherwise, routine 800 proceeds to exit.

At 806, routine 800 judges whether or not to evacuate the crankcase of gases. Crankcase gases may include a mixture of air and hydrocarbons. Air may enter the engine crankcase when small amounts of cylinder charge pass the engine pistons and rings. Hydrocarbons in the engine crankcase may come from engine oil or from portions of cylinder charge that pass engine pistons. In one example, gases from the crankcase are routed from the crankcase to the compressor when engine load exceeds a predetermined threshold load amount. Since the compressor is a contiguous portion of the engine block, crankcase gases can be evacuated without the gases exiting the engine block. Routine 800 proceeds to 808 if it is judged not to evacuate gases from the engine crankcase. Routine 800 proceeds to 816 if it is judged to evacuate gases from the engine crankcase.

At 816, routine pulls gases from the engine crankcase. In one example, a crankcase ventilation valve is opened so that gases pass through a wall of an engine block that separates the engine crankcase and the compressor low pressure chamber. Further, in one example, the compressor low pressure chamber is part of a contiguous engine block. Routine 800 proceeds to 808 after the evacuation of crankcase gases begins.

At 808, routine 800 compresses air from within the engine block. In one example, air contained in a valley area of a V type engine is compressed by a compressor having a housing that is at least partially part of a continuous engine block. The compressor includes scrolls or lobes for pressurizing air that enters the engine block. Routine 800 proceeds to 810 after pressurizing air from the engine block.

At 810, routine routes compressed air through an intercooler. In one example, the intercooler may be coupled to the sides of an engine block and above a compressor, the compressor located in the valley of the engine. Routine 800 proceeds to 812 after fresh air is routed to the intercooler.

At 812, routine 800 cools compressed air with engine coolant from the engine block. In one example, coolant is passed directly from the engine block to the intercooler without any intermediate hoses or connections by coupling the intercooler to the engine block and aligning engine block coolant ports with coolant ports located on the intercooler. Routine 800 proceeds to 814 after compressed air is cooled with engine coolant.

At 814, engine cylinders are supplied with cooled compressed air. In one example, an intake manifold routes air from an intercooler to engine cylinders. In particular, an outlet port of an intercooler is mated to an inlet port of an intake manifold, and the intake manifold outlet ports are mated to intake ports of a cylinder head. In this way, cooled compressed air is routed from an intercooler to engine cylinders.

Additionally, the intake manifold may be in the same plane as the cylinder head air inlets so that the intake runners of the intake manifold are horizontal. Routine 800 proceeds to exit.

As will be appreciated by one of ordinary skill in the art, routines described in FIG. 8 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A system, comprising:
    a V type engine block having a plurality of cylinders for housing a plurality of pistons, said engine block forming at least a portion of a supercharger air compressor housing, said supercharger air compressor housing having an inlet for fresh air and an outlet that provides compressed air to cylinders in said V type engine block;
    a cylinder head receiving air from said supercharger air compressor housing; and
    a compressor scroll or rotor surrounded by the supercharger air compressor housing.

2. The system of claim 1 where said V type engine block includes a span extending from a first engine block wall to a second engine block wall and at least partially covering the compressor scroll or rotor fitted into said V type engine block, and where said cylinder head is at least one cylinder head coupled to said V type engine block.

3. The system of claim 2 further comprising an intercooler coupled to said V type engine block, said intercooler located above said compressor scroll or rotor.

4. The system of claim 1 where said at least a portion of said supercharger air compressor housing is located in between cylinders in a valley of the V type engine block.

5. The system of claim 1 where said V type engine block includes a machined surface on an inside of said supercharger air compressor housing for sealing a lower section of the compressor housing from an upper section of the compressor housing.

6. A system, comprising:
    a V type engine cylinder block having a plurality of cylinders for housing a plurality of pistons, said engine cylinder block forming at least a portion of a supercharger air compressor housing;
    an intake manifold in communication with said supercharger air compressor housing; and
    an intercooler positioned in an air path downstream of said supercharger air compressor housing and upstream of said intake manifold.

7. The system of claim 6 where said intercooler is coupled to said V type engine cylinder block and said intake manifold.

8. The system of claim 7 where said intercooler is in communication with at least a coolant passage of said V type engine cylinder block.

9. The system of claim 8 where said intake manifold includes a port for bypassing said supercharger air compressor housing and said intercooler.

10. The system of claim 6 where said intercooler is positioned in a valley of said V type engine cylinder block.

11. The system of claim 6 where at least one compressor rotor or scroll is located within said supercharger air compressor housing and where said at least one compressor rotor or scroll is driven by a crankshaft.

12. A system, comprising:
    an engine cylinder block having a plurality of cylinders for housing a plurality of pistons, said engine cylinder block forming at least a portion of a supercharger air compressor housing, said supercharger air compressor housing including at least one at least partially machined surface for accommodating a compressor rotor or scroll;
    at least one cylinder head coupled to said engine cylinder block; and
    a port in the engine cylinder block for inducting gases directly from a crankcase to said supercharger air compressor housing, said crankcase at least partially formed by said engine cylinder block, and an oil separator positioned along said port.

13. The system of claim 12 where said at least one at least partially machined surface is inside said supercharger air compressor housing and where said compressor rotor or scroll is driven by a crankshaft, said crankshaft coupled to said engine cylinder block.

14. The system of claim 12 where the engine cylinder block further includes a supercharger air compressor inlet and outlet.

15. The system of claim 12 further comprising an intercooler coupled to said engine cylinder block, said intercooler located above said compressor scroll or rotor, said intercooler in communication with at least a coolant passage of said engine cylinder block or with said at least one cylinder.

16. The system of claim 12 where said at least one at least partially machined surface is machined referenced to a datum of said engine cylinder block.

17. The system of claim 15 further including a manifold directing compressed air from said intercooler to said at least one cylinder head.

* * * * *